A. WILZIN.
GATHERING DEVICE FOR GLASS GATHERING AND BLOWING MACHINES.
APPLICATION FILED MAR. 3, 1917.

1,263,982.

Patented Apr. 23, 1918.
2 SHEETS—SHEET 1.

INVENTOR
Arthur Wilzin
per
John E Raworth
Attorney.

A. WILZIN.
GATHERING DEVICE FOR GLASS GATHERING AND BLOWING MACHINES.
APPLICATION FILED MAR. 3, 1917.

1,263,982.

Patented Apr. 23, 1918.
2 SHEETS—SHEET 2.

INVENTOR
Arthur Wilzin
per John E. Raworth
Attorney.

UNITED STATES PATENT OFFICE.

ARTHUR WILZIN, OF ST. OUEN, FRANCE.

GATHERING DEVICE FOR GLASS GATHERING AND BLOWING MACHINES.

1,263,982.   Specification of Letters Patent.   Patented Apr. 23, 1918.

Application filed March 3, 1917. Serial No. 152,345.

*To all whom it may concern:*

Be it known that I, ARTHUR WILZIN, a citizen of the United States of America, and resident of St. Ouen, Seine, France, have invented new and useful Improvements in or in Connection with Gathering Devices for Glass Gathering and Blowing Machines, of which the following is a specification.

In the specification and drawings forming part of British Letters Patent No. 3146/15, dated 3rd March, 1914, and granted to the present applicant, there is described and shown a glass gathering and blowing machine of the type in which the molten glass is introduced by suction into the lower end of the measuring or parison mold, and there is shown in, and described with reference to, Fig. 7 a gathering device for use in connection with a machine of the type specified and embodying a vertically disposed tubular body, the lower end of which is always immersed in the molten glass in the furnace, said body being so controlled and actuated that it is raised and its upper end brought into contact with the lower end of the parison mold while the air is being exhausted from said mold and is lowered out of contact with the parison mold when the said mold has been filled with glass.

The invention has for its object to provide improvements in or in connection with gathering devices of the kind mentioned, whereby the operation of gathering by suction shall be rendered more reliable and convenient.

A gathering device in accordance with this invention for use in conjunction with glass gathering and blowing machines of the type referred to, comprises a vertically disposed tubular body movably interposed between the molten glass in the furnace and the bottom of the parison mold and so controlled and arranged that, except at the time of gathering, it is out of contact with both and is subject, both exteriorly and interiorly, and for its full length, to the heating action of the flames of the furnace.

The present invention necessitates the employment of a specially shaped furnace façade.

Referring now to the accompanying drawings, which are illustrative only—

Figure 1:
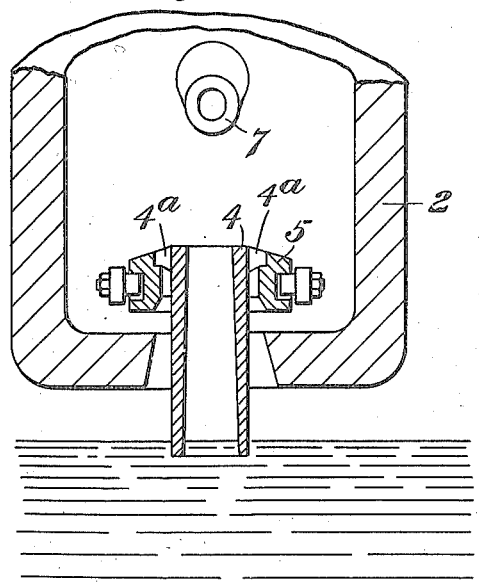
Figure 1 is a vertical section of the gathering device in its relation with the specially shaped furnace façade, the section being in a plane parallel to the furnace façade and passing through the center of the gathering device.
Figure 2:
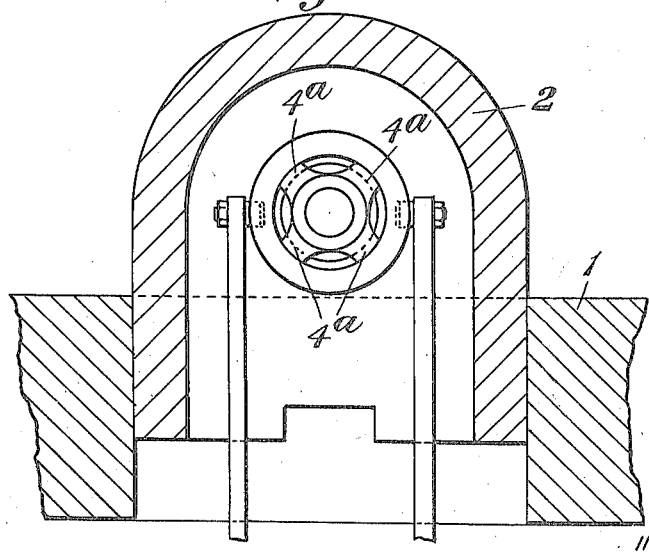
Fig. 2 is a plan view of the gathering device, the furnace façade being in section.

The furnace façade 1 is provided with a plurality of inwardly extending and removable pockets 2, the bottom floor of each of which is formed with a hole 3. The pockets 2 are employed instead of the usual outwardly extending wells or ante-chambers and their employment overcomes the objections that pertain to the use of wells or ante-chambers and the difficulty of heating the glass and maintaining the heat of the glass contained therein.

4 is the gathering device. As illustrated, it comprises a tubular body provided at its upper end with a plurality of wings or projections 4ª. 5 is a collar or ring that is carried at the outer ends of a pair of lever arms 6 pivotally mounted on an abutment or a part of the blowing machine proper. The collar 5 is so shaped that the gathering device extends therethrough and is supported by the wings or projections 4ª and the lever arms 6 are of such length that the gathering device is positioned concentrically with the hole 3. When the lever arms 6 are turned about their pivotal points the collar 5 and gathering device 4 will be raised or lowered and the lower end of the gathering device withdrawn from or projected into the molten glass in the furnace. The hole 3 is considerably larger in diameter that the outer diameter of the gathering device and the inner diameter of the collar 5 is also considerably greater than the outer diameter of the gathering device, so that passages or interstices are formed by and between the collar and the gathering device and the wings or projections thereon.

Figure 3:
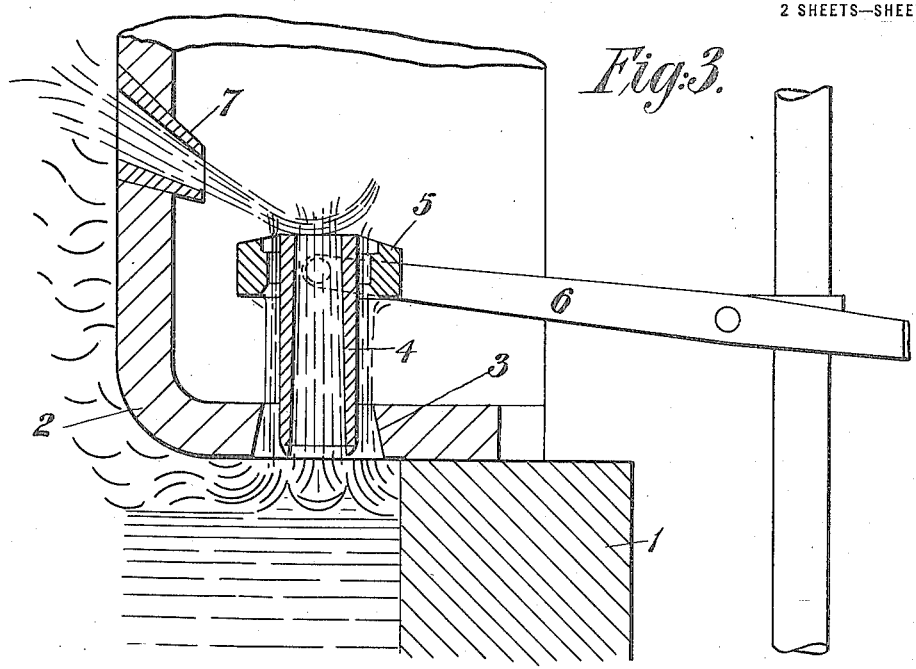
Fig. 3 is a vertical sectional view in a plane at right angles to the view shown in Fig. 1, the gathering device being shown raised out of the molten glass.
Figure 4:
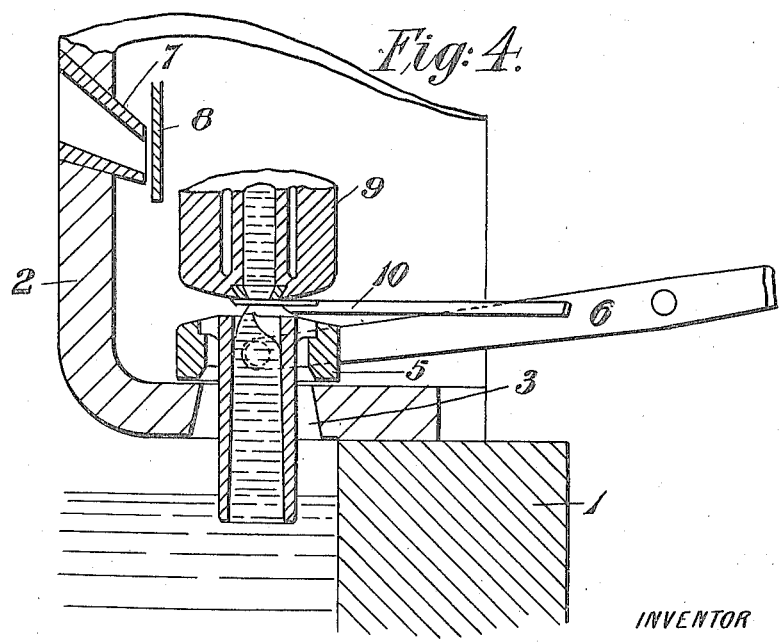
Fig. 4 is a similar view to Fig. 3, but showing also the parison mold.

The flames in the furnace which play upon and heat up the glass are under a slight pressure and tend to issue through the hole 3. Any flames so issuing will, as shown in Fig. 3, act upon the gathering device and will pass upward thereof both exteriorly and interiorly. As a consequence, the gathering device will be heated and maintained in a heated condition and any liability of congelation of glass in the gathering device, owing to the chilling action of the air and also to the contact of the mold therewith, as hereinafter explained, will be obviated. If it should be found in practice that the heating effect from the flames playing upon the interior and exterior of the gathering device is insufficient to maintain the upper end of the same in a properly heated condition, the pockets 2 may each be provided with a tube 7 of such shape and so disposed that flame issuing therefrom is directed on to the upper end of the gathering device (see Fig. 3). In Fig. 4 a shield 8 is shown interposed between the end of the tube 7 and the parison mold 9. This shield is provided for the purpose of protecting the parison mold from the action of the flame when glass is being gathered. The shield 8 is attached to the parison mold 9 or to a portion of the blowing machine adjacent thereto so as to move with the parison mold.

Fig. 3 shows very clearly the action of the flames on the gathering device. The operation of the device is as follows:—

As soon as the parison mold is placed above the gathering device 4 and its evacuation valve opened, the levers 6 acting upon the collar 5 raise the gathering device into contact with the bottom of the parison mold, thereby causing the air to be exhausted from both the mold and the gathering device. At this time the lower end of the gathering device is immersed in the molten glass. Under these conditions the glass rises at once and fills the gathering device and the parison mold. It will be observed that the diameter of the aperture of the gathering device is greater than that of the parison mold. When, therefore, the glass rises within the gathering device a portion of the glass strikes against the bottom of the parison mold and forms a seal between the gathering device and the mold. As soon as the parison mold is filled, the gathering device is slightly lowered and simultaneously the shearing knife 10 is moved forward beneath the bottom of the parison mold, thus cutting off the glass and closing the bottom of the mold. The mold is then moved away clear of the gathering device, which is then raised so that its lower end is no longer immersed in the molten glass in the furnace. The gathering device is raised sufficiently high to allow the glass contained therein to drop or flow back into the furnace and the flames to pass upwardly interiorly of the device. When the parison mold has been emptied the gathering device is lowered to its initial position and the parison mold is moved above the gathering device, as before described, where the cycle recommences.

Having now particularly described and ascertained the nature of my said invention and in what manner the same is to be performed, I declare that what I claim is:—

1. A suction gathering device for use in conjunction with the parison mold in glass gathering and blowing machines, comprising a vertically disposed tubular member adapted to be movably interposed between the molten glass in the furnace and the bottom of the parison mold, said tubular member, except at the time of gathering, being out of contact with both said molten glass and said parison mold.

2. A suction gathering device for use in conjunction with the parison mold in glass gathering and blowing machines, comprising a vertically disposed tubular member partly located within a furnace and adapted to be movably interposed between the molten glass in the furnace and the bottom of the parison mold, said tubular member except at the time of gathering being out of contact with said molten glass and said parison mold, and being subject for its full length exteriorly and interiorly to the heating action of flames issuing from the furnace.

3. In a glass gathering and blowing machine, the combination with a parison mold, of a suction gathering device comprising a vertically disposed tubular member adapted to be interposed between the molten glass in a furnace and the bottom of the parison mold, said gathering device being located within an inwardly projecting pocket formed in the furnace façade, said pocket having a communicating opening with the interior of the furnace through which opening the gathering device is movable into and out of the molten glass contained in the furnace.

4. In a glass gathering and blowing machine, the combination with a parison mold, of a suction gathering device comprising a vertically disposed tubular member adapted to be interposed between the molten glass in a furnace and the bottom of the parison mold, said gathering device being located within an inwardly projecting pocket having a communicating opening with the interior of the furnace, through which opening the gathering device is movable into and out of the molten glass contained in the furnace, said opening being of such size and shape as to permit the issuance of flames from the furnace against the exterior of said gathering device.

5. A suction gathering device for use in conjunction with the parison mold in glass gathering and blowing machines comprising a vertically disposed tubular member adapted to be movably interposed between the molten glass in the furnace and the bottom of the parison mold, said gathering device being carried by a collar in such manner that the flame issuing from the furnace and enveloping the gathering device can act thereon for its full length.

6. In a glass gathering and blowing machine, the combination with a parison mold, of a suction gathering device comprising a vertically disposed tubular member adapted to be interposed between the molten glass in a furnace and the bottom of the parison mold, said gathering device being located within an inwardly projecting pocket formed in the furnace façade, said pocket having a communicating opening with the interior of the furnace through which opening the gathering device is movable into and out of the molten glass contained in the furnace, and having a second communicating opening with the interior of the furnace so located that the flames issuing therefrom are directed against the upper end of the gathering device.

7. A suction gathering device for use in conjunction with the parison mold in glass gathering and blowing machines comprising a vertically disposed tubular member adapted to be movably interposed between the molten glass in the furnace and the bottom of the parison mold, the bore of the tubular member being greater than the bore of the parison mold, so that when the column of glass rises in the gathering device, a portion thereof is stopped by contact with the parison mold and forms an airtight joint between the gathering device and the parison mold.

8. In a glass gathering and blowing machine, the combination with a parison mold, of a suction gathering device comprising a vertically disposed tubular member adapted to be interposed between the molten glass in a furnace and the bottom of the parison mold, said gathering device being located within an inwardly projecting pocket formed in the furnace façade, said pocket having a communicating opening with the interior of the furnace through which opening the gathering device is movable into and out of the molten glass contained in the furnace, and having a second communicating opening with the interior of the furnace so located that the flames issuing therefrom are directed against the upper end of the gathering device, and a shield adapted to close said second opening during the gathering operation.

9. A suction gathering device for use in connection with the parison mold in glass gathering and blowing machines, comprising a vertically disposed tubular member partly located within a furnace and adapted to be movably interposed between the molten glass in the furnace and the bottom of the parison mold, said tubular member except at the time of gathering, being out of contact with said molten glass and said parison mold.

10. In a glass gathering and blowing machine, the combination with a parison mold, of a suction gathering device comprising a vertically disposed tubular member open at both ends and adapted to be movably interposed between, and make simultaneous contact with, the molten glass in the furnace and the bottom of the parison mold during the filling of the same, and means to raise said tubular member out of contact with said molten glass.

11. Gathering apparatus for a glass working machine, comprising in combination, a suction-mold open below, a tubular member open at both ends movably interposed between the bottom of the suction mold and molten glass in a container beneath said tubular member, and adapted to simultaneously contact with both, and to be raised out of and above the level of the glass after the suction mold has been moved away.

Dated this 5th day of February, 1917.

ARTHUR WILZIN.